United States Patent [19]

Chang et al.

[11] Patent Number: 5,142,660
[45] Date of Patent: Aug. 25, 1992

[54] BROADBAND LIGHT SOURCE USING RARE EARTH DOPED GLASS WAVEGUIDE

[75] Inventors: Chin-Lung Chang, West Covina; Sidney X. Y. Huang, West Hills, both of Calif.

[73] Assignee: Litton Systems, Inc., Beverly Hills, Calif.

[21] Appl. No.: 666,206

[22] Filed: Mar. 7, 1991

[51] Int. Cl.$^5$ .............................................. G02B 6/34
[52] U.S. Cl. ........................................................ 385/10
[58] Field of Search ............... 350/96.12, 96.13, 96.19; 372/102

[56] References Cited

U.S. PATENT DOCUMENTS

| | | | |
|---|---|---|---|
| 4,860,294 | 8/1989 | Winzer et al. | 350/96.19 |
| 4,874,216 | 10/1989 | Utaka et al. | 350/96.19 |
| 4,922,496 | 5/1990 | Po | 372/6 |
| 4,935,930 | 6/1990 | Handa | 350/96.19 |
| 4,946,245 | 8/1990 | Chamberlin et al. | 350/96.19 |
| 4,952,059 | 8/1990 | Desurvire et al. | 356/350 |
| 4,959,837 | 9/1990 | Fevrier et al. | 372/6 |
| 4,963,177 | 10/1990 | Najafi et al. | 350/96.19 |
| 5,016,967 | 5/1991 | Meltz et al. | 350/96.19 |

OTHER PUBLICATIONS

Kitagawa et al., "Guided-Wave Laser Based on Erbium-Doped Silica Planar Lightwave Circuit," Electronics Letters, vol. 27, No. 4, Feb. 14, 1991, pp. 334–335.

Primary Examiner—John D. Lee
Assistant Examiner—Robert E. Wise
Attorney, Agent, or Firm—Lynn & Lynn

[57] ABSTRACT

A rare-earth doped glass waveguide is optically pumped to produce superfluorescent light. The waveguide is formed in a glass substrate. The pump light is input to a first end of the optical waveguide, and the output is emitted from the other end. A grating formed on the waveguide near the output end reflects the pump light to separate the pump light from the output light.

22 Claims, 2 Drawing Sheets

BROADBAND LIGHT SOURCE USING RARE EARTH DOPED GLASS WAVEGUIDE

BACKGROUND OF THE INVENTION

This invention relates generally to light sources and particularly to light sources suitable for forming counter propagating waves in the sensing loop of a fiber optic rotation sensor. Still more particularly, this invention relates to a light source formed in a glass waveguide for use in a fiber optic rotation sensor.

A fiber optic ring interferometer typically comprises a loop of fiber optic material that guides counter-propagating light waves. The light waves typically originate in a solid state optical source such as a superluminescent diode. Rotation of the loop creates a relative phase difference between the counter-propagating waves by the well known Sagnac effect. The amount of phase difference is a function of the angular velocity of the loop. After traversing the loop, the counter-propagating waves combine so that they constructively or destructively interfere to form an optical output signal.

The output signal produced by the interference of the counter-propagating waves varies in intensity as a function of the rotation rate of the loop. Rotation sensing is accomplished by detecting the optical output signal and processing it to determine the rotation rate.

Superluminescent diodes are the light sources in some rotation sensing systems. Superluminescent diodes provide light having the desired broad bandwidth. However, superluminescent diodes are expensive and have operating lifetimes that are too short for use in many navigating systems. A triaxial gyro for measuring rotations about three mutually perpendicular axes as required for navigation may include three SLD light sources. A triaxial gyro may also include a plurality of optical couplers arranged to divide the light output from a single SLD source to provide three separate beams. Both of these approaches for providing suitable light beams for a triaxial gyro are expensive and do not solve the short lifetime problem associated with SLDs.

SUMMARY OF THE INVENTION

The present invention provides a superfluorescent light source that overcomes the difficulties with previous light sources for fiber optic rotation sensors. The present invention provides a rare-earth doped glass waveguide that, when optically pumped, functions as a broadband light source. The light source further reduces the product cost for the fiber optical gyro. A significant advantage of the present invention is that it allows production of light sources for fiber optic rotation sensors using a batch process. Furthermore, the light source according to the present invention can be designed and fabricated such that light splitting and filtration can be obtained in a single chip. The present invention also provides a light source for a triaxial gyro that reduces the number of optical couplers as compared to previous designs.

A method for producing an optical signal according to the present invention comprises the steps of forming a substrate and forming an optical waveguide in the substrate. The method further includes introducing pump light into a first end of the optical waveguide for optically pumping the waveguide at a pump light wavelength to produce output light having a known output wavelength and separating light having the pump wavelength from the output light.

The step of separating light having the pump wavelength from the output light may include the step of reflecting the light having the pump light wavelength. Reflecting the pump light preferably includes the step of forming a grating on the optical waveguide so that the grating spacing and the pump light wavelength satisfy the Bragg condition that $2\Lambda = (m\lambda/n_{eff})$, where m is an integer, $\Lambda$ is the grating period, $\lambda$ is the wavelength of the pump light and $n_{eff}$ is the effective refractive index of the waveguide 14. Another grating may be used to reflect light having the output wavelength away from the first end of the waveguide to increase the intensity of the light output.

The step of separating the pump light wavelength from the output light may alternatively include the step of using an optical coupler to remove the pump light from the output light. A wavelength demultiplexing coupler may be used to couple pump light into a waveguide that contains a gain medium. The pump light makes a first pass through the gain medium and then preferably reflects back through the gain medium toward the wavelength demultiplexing coupler. The superfluorescent light created in the gain medium is unaffected by the coupler and propagates toward the output end of the waveguide. The wavelength demultiplexing coupler removes the pump light from the waveguide.

The method according to the present invention preferably further includes the step forming the substrate to comprise a glass material that includes Er/Yb/Al. The optical waveguide is preferably formed by a process that includes ion exchange to introduce silver ions into selected regions of the substrate.

To provide a light source for a triaxial fiber optic rotation sensor the present invention preferably includes first, second and third optical waveguides formed in the substrate. Pump light is introduced into the first optical waveguide. An optical coupler couples pump light from the first optical waveguide into the second and third optical waveguides so that the second and third optical waveguides are optically pumped at the pump light wavelength. Light beams having the output wavelength are then produced in the second and third optical waveguides. The method of the present invention preferably also includes separating light having the pump light wavelength in the optical waveguides from the output light. Light having the output wavelength reflects away from the coupler so that this light is in the output of the waveguides.

DESCRIPTION OF THE PREFERRED EMBODIMENT

Figure 1:
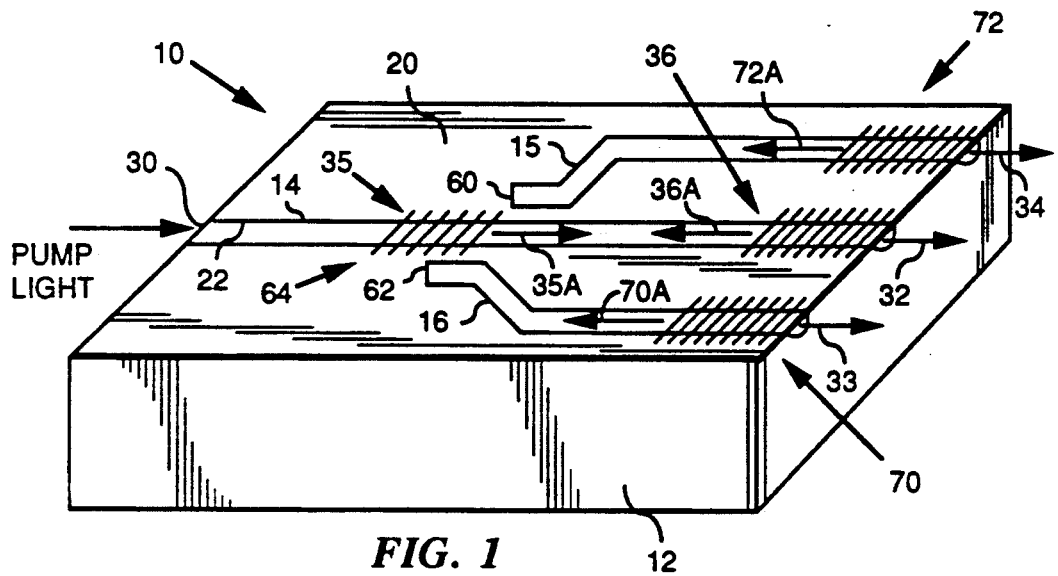
FIG. 1 is a perspective view of a first embodiment of the invention in which an optical waveguide that functions as a light sources is formed in a substrate.

Referring to FIG. 1, a light source 10 according to the present invention includes a substrate 12. The substrate 12 is preferably formed of a glass that is doped with Er/Yb/Al. Such glass is commercially available and is well-known.

Figure 2:
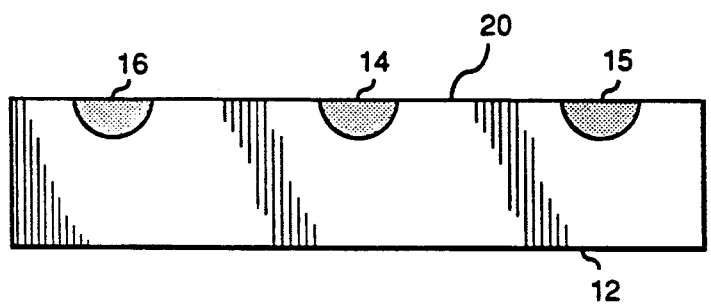
FIG. 2 is an end elevation view of the apparatus shown in FIG. 1.

FIGS. 1 and 2 sow three waveguides 14-16 formed on a surface 20 of the substrate 12. The waveguides 14-16 may be conveniently formed by the ion exchange technique. The substrate 12 is masked and placed in a solvent (not shown) such as a silver nitrate ($AgNO_3$) melt. The waveguides are formed by leaving unmasked strips about 5 to 7 $\mu$m wide on the surface 20. The unmasked portions of the surface 20 are then exposed to the solvent. Exposing the surface 20 to the solvent causes silver ions in the solvent to replace some of the sodium ions in the glass.

The portions of the substrate 12 where the silver ions are located have an electric dipole moment larger than that of the adjacent substrate material. The refractive index of a dielectric is a function of the electric dipole moment of the dielectric. Increasing the electric dipole moment increases the refractive index. The refractive index of the regions that are doped with the silver ions is therefore larger than the refractive index of the surrounding material. The width of the waveguide 14, for example, is selected such that most of the light propagating therein impinges upon the waveguide/substrate interface 22 at an angle greater than the critical angle for total internal reflection. The waveguides 14-15 preferably guide optical wavelengths in the range of 980 nm to 1590 nm.

Figure 3:
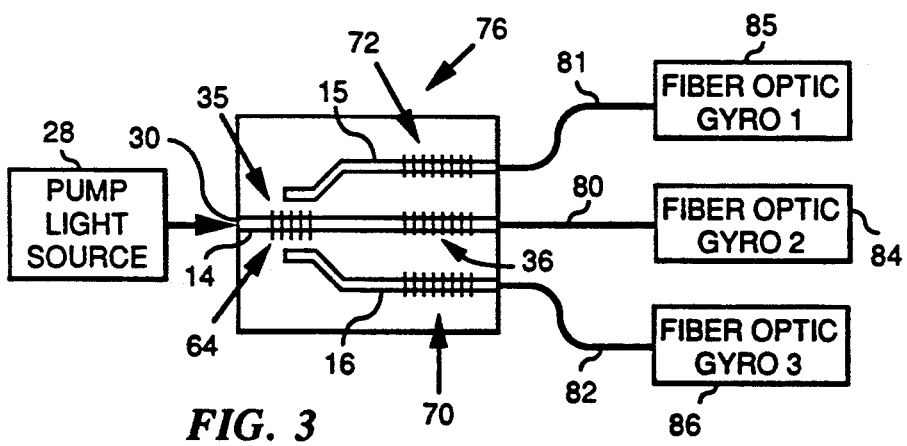
FIG. 3 illustrates a triaxial fiber optic rotation sensing system that includes the light source of FIGS. 1 and 2.

Referring to FIGS. 1 and 3, a pump light source 28 such as a high power laser diode provides a pump light input to an end 30 of the waveguide 14. The pump light preferably has a wavelength of 980 nm or 1420 nm.

The erbium absorbs a portion of the pump light and then has a population inversion. The erbium then emits superfluorescent light having a wavelength in the range of 1540-1580 nm. The center of the bandwidth of the emitted superfluorescent is therefore 1560 nm. For convenience, the light emitted from the erbium is referred to herein as 1560 nm light. It should be understood that the superfluorescent light has a bandwidth of 20 nm on each side of the 1560 nm wavelength. If the erbium and ytterbium concentrations in the glass waveguide are sufficiently high, then high output power can be realized by the use of a short waveguide having a length of only 1 to 2 cm. The ytterbium in the waveguide 14 acts as a sensitizer to enhance population inversion of the optical pumping process.

Most of the 1560 nm light emitted from the erbium is directed so that i strikes the waveguide/substrate interface 22 at an angle greater than or equal to the critical angle. Therefore, most of the 1560 nm light is guided by the waveguide 14. Half of the 1560 nm light guided by the waveguide 14 is directed back toward the source, and half propagates to the right as shown in FIG. 1. The 1560 nm light that propagates to the right as shown in FIG. 1 is the output of the waveguide 14. The arrow 32 represents the 1560 nm light output from the waveguide 14.

The intensity of the 1560 nm light output form the waveguide 14 may be increased by placing a grating 35 on the waveguide 14. The grating 35 may be formed on the waveguide 14 by a process such as reactive ion etching. The grating 35 should be designed to satisfy the Bragg condition for the output light wavelength so that $2\Lambda = (m\lambda/n_{eff})$, where m is an integer, $\Lambda$ is the grating period, $\lambda$ is the wavelength of the output light and $n_{eff}$ is the effective refractive index of the waveguide 14. The grating 35 therefore has a reflectivity $R_1 = 1.0$ for the output light wavelength of 1560 nm.

Pump light may be removed from the output of the waveguide 14 by placing a grating 36 on the waveguide 14 near its output end. The grating 36 should be designed to satisfy the Bragg condition for the pump light wavelength so that $2\Lambda = (m\lambda/n_{eff})$, where m is an integer, $\Lambda$ is the grating period, $\lambda$ is the wavelength of the pump light and $n_{eff}$ is the effective refractive index of the waveguide 14. The grating 36 therefore has a reflectivity $R_1 = 1.0$ for the pump light wavelength and a reflectivity $R_2 = 0$ for the 1560 nm light emitted by the erbium. In addition to removing the pump light from the output, the grating causes the pump light to make another pass through the gain medium again. Therefore, the grating 36 causes an increase in the intensity of the output light and removes the pump light from the output.

A fiber optic rotation sensor should include a broadband light source to provide the desired bias stability and acceptably low random walk. The light source 10 provides an output beam having a 10 nm to 20 nm line width, which is suitable for use in a fiber optic rotation sensor.

The pump light source should be temperature stabilized. A commercially available high power diode suitable for use with the present invention has a scale factor of 1 ppm/° C. Superluminescent diodes used in fiber optic rotation sensors typically have scale factors of about 300 ppm/° C. The light source 10 therefore is much more thermally stable than superluminescent diodes.

Navigation requires measuring angular rotation rates about three mutually perpendicular axes. A fiber optic rotation sensing system for navigation applications is a triaxial system that has three fiber optic gyroscopes. The principles of the present invention may be used to produce multiple output beams. Each beam may then be input to a separate fiber optic rotation sensor to form a triaxial rotation sensing system.

Referring to FIG. 1, the light source 10 has three output beams indicated by the arrows 32-34. The waveguide 15 has a portion 60 that is very close to the waveguide 14 so that part of the pump light directed to the right in the waveguide 14 couples into the waveguide 15 via evanescent field coupling. Similarly, the waveguide 16 has a portion 62 that allows coupling of light from the waveguide 14 into the waveguide 16 via evanescent field coupling. A 1×3 optical coupler 64 is therefore formed at the region of the substrate 12 where the waveguide 14 is near the waveguide portions 60 and 62. The coupler 64 divides the pump light so that each of the three waveguides 14-16 receives sufficient pump light to produce an output beam in the manner described above for the waveguide 14. Gratings 70 and 72 are formed on the waveguides 15 and 16, respectively, to reflect the pump light therein so that the beams output from these waveguides do not include the pump wavelength.

FIG. 3 illustrates a triaxial fiber optic rotation sensing system 76. The optical outputs of the waveguides 14-16 are input to optical fibers 80-82. The optical fibers 80-82 guide the 1560 nm light beams to fiber optic gyros 84–86, respectively. The coupler 64 should divide the pump light so that each of the waveguides 14–16 produces output beams of sufficient power of equal intensity.

As shown in FIG. 3, the grating 35 is preferably placed near the coupler 64. Part of the grating 35 may extend into the region between the central waveguide 14 and the waveguides 15 and 16, which are on opposite sides of the waveguide 14. Any light in the waveguides 15 and 16 having the output wavelength that propagates toward the coupler 64 reflects back toward the output ends of the waveguides.

The light source 10 provides excellent coupling to the single mode optical fibers used in fiber optic rotation sensors. The dimensions of the waveguide 14 permit about 90% of the light output therefrom to be input into an optical fiber. The light source 10 provides about 1 mW of optical power into a fiber optic rotation sensor.

Figure 4:
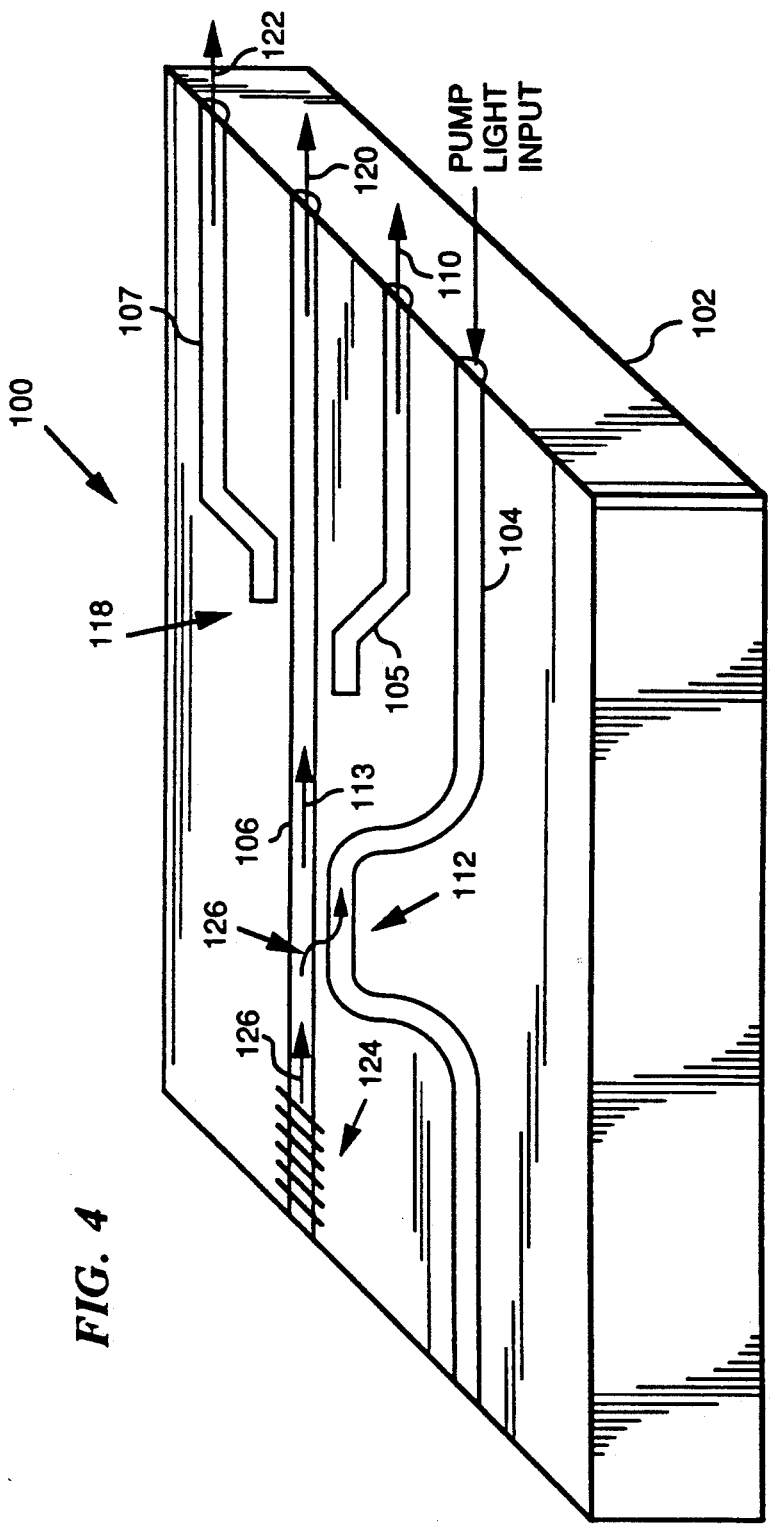
FIG. 4 illustrates a second embodiment of a light source according to the invention that includes a wavelength demultiplexing coupler for introducing pump light into a gain medium and removing the pump light from the light source.

FIG. 4 illustrates a light source 100 according to the invention that uses a backward pumping scheme. The light source 100 includes a substrate 102, which may be substantially identical to the substrate 12 described above. Optical waveguides 104–107 are formed in the substrate 102.

Pump light is input to the waveguide 104 at the end 110 of the substrate. The pump light propagates to a coupler 112 formed to couple light between the waveguide 104 and the waveguide 105. The coupler 112 is a wavelength demultiplexing coupler, which has a coupling efficiency of nearly 100% for one or more selected wavelengths and a coupling efficiency of zero for other wavelengths. In the light source 100 the coupler 110 has a coupling efficiency of 100% for the pump light wavelength, which may be 980 nm, for example.

The waveguide 105 may be substantially identical to the waveguide 14 of FIG. 1. The pump light coupled into the waveguide 105 interacts with the Er/Yb/Al and produces superfluorescent light as described above. Part of the superfluorescent light propagates to the right in the waveguide 105 as viewed in FIG. 4. The arrow 113 in the waveguide 106 indicates the superfluorescent light that propagates to the right toward the output end of the light source 100.

A coupler 118 is formed between the waveguides 105–107. Part of the light traveling to the right in the waveguide 105 couples into the waveguides 106 and 107. The output light preferably divides in the coupler 118 such that each of the waveguides 105–107 guides beams of equal intensity and identical wavelength. The arrows 120–122 represent the optical beams output form the light source 100.

A grating 124 is formed on the waveguide 105 near the left end as viewed in FIG. 4. The grating satisfies the Bragg condition for the pump light. After interacting with the gain medium in the waveguide 105, the pump light reaches the grating 124 and reflects back toward the coupler 112. The arrow 126 represents the reflected pump light in the waveguide 105. The pump light therefore makes two passes through the gain medium, which improves the gain. The coupler 112 then couples the pump light out of the waveguide 105 and into the waveguide 104. The arrow 128 represents pump light coupled back into the waveguide 104. Therefore, the light propagating in the waveguide 105 toward the coupler 118 contains almost no pump light.

The structures and methods disclosed herein illustrate the principles of the present invention. The invention may be embodied in other specific forms without departing from its spirit or essential characteristics. Therefore, the described embodiments are to to be considered in all respects as exemplary and illustrative rather than restrictive. The appended claims rather than the foregoing descriptions define the scope of the invention. All modifications to the embodiments described herein that come within the meaning and range of equivalence of the claims are embraced within the scope of the invention.

What is claimed is:

1. An optical signal source, comprising:
   a substrate formed of a glass doped with Erbium;
   an optical waveguide in the substrate, the optical waveguide having an input end and an output end;
   means for introducing pump light into the input end of the optical waveguide for optically pumping Erbium in the waveguide at a pump light wavelength to produce output light having a known output wavelength; and
   means for separating light having the pump light wavelength from the output light to reduce the pump light intensity in the output of the optical waveguide.

2. The optical signal source of claim 1 wherein the means for separating light having the pump light wavelength from the output light includes means for reflecting light having the pump light wavelength to separate light having the pump wavelength from the output light.

3. The optical signal source of claim 2 wherein the means for reflecting the light having the pump light wavelength includes means for forming a grating on the optical waveguide adjacent its output end with the grating spacing and the pump light wavelength satisfying the Bragg condition that $17\Lambda = (m\lambda/n_{eff})$, where m is an integer, $\Lambda$ is the grating period and $\lambda$ is the wavelength of the pump light.

4. The optical signal source of claim 3 including means for forming a grating adjacent the input end of the grating to reflect light having the output wavelength toward the output end of the waveguide.

5. The optical signal source of claim 1 including means for forming a grating adjacent the input end of the grating to reflect light having the output wavelength toward the output end of the waveguide.

6. The optical signal source of claim 1 wherein the means for separating light having the pump light wavelength from the output light includes means for optically coupling light having the pump wavelength out of the waveguide.

7. The optical signal source of claim 6 including means for forming a grating adjacent the input end of the grating to reflect light having the output wavelength toward the output end of the grating.

8. The optical signal source of claim 1 including:
   first, second and third optical waveguides formed in the substrate;
   means for introducing pump light into the first optical waveguide to pump the Erbium therein and produce a first output light beam;
   an optical coupler formed to couple pump light from the first optical waveguide into the second and third optical waveguides so that the Erbium in the second and third optical waveguides is optically pumped at the pump light wavelength to produce second and third output light beams having the output wavelength in the second and third optical waveguides, respectively; and means for separating light having the pump light wavelength in the second and third optical waveguides from the output light to reduce the pump light intensity in the output of the optical waveguide.

9. The optical signal source of claim 8 including means for separating light having the pump light wavelength from the output light includes means for reflecting light having the pump light wavelength in each of the first, second and third optical waveguides.

10. The optical signal source of claim 9 wherein the means for reflecting the light having the pump light wavelength includes means for forming a grating adjacent each of the first, second and third optical waveguides with the grating spacing and the pump light wavelength satisfying the Bragg condition that $2\Lambda = (m\lambda/n_{eff})$, where m is an integer, $\Lambda$ is the grating period and $\lambda$ is the wavelength of the pump light.

11. The optical signal source of claim 8 including means for forming a grating adjacent the coupler to reflect light having the output wavelength toward the output end of the first, second and third optical waveguides.

12. The optical signal source of claim 11 wherein the means for separating light having the pump light wavelength form the output light includes means for optically coupling light having the pump wavelength out of the first waveguide.

13. The optical signal source of claim 12 including means for forming a grating adjacent the coupler to reflect light having the output wavelength toward the output end of the first, second and third optical waveguides.

14. A method for producing an optical signal source, comprising the steps of:
   forming a substrate formed of a glass doped with Erbium;
   forming an optical waveguide in the substrate, the optical waveguide having an input end and an output end;
   introducing pump light into the input end of the optical waveguide for optically pumping Erbium in the waveguide at a pump light wavelength to produce output light having a known output wavelength; and
   separating light having the pump light wavelength from the output light to reduce the pump light intensity in the output of the optical waveguide by forming a grating on the optical waveguide adjacent its output end with the grating satisfying the Bragg condition to reflect the pump light.

15. The method of claim 14 wherein the step of separating light having the pump light wavelength from the output light includes the step of optically coupling light having the pump wavelength out of the waveguide.

16. The method of claim 14 including the steps of:
   forming first, second and third optical waveguides in the substrate;
   introducing pump light into the first optical waveguide to pump the Erbium therein and produce a first output light beam;
   forming an optical coupler to couple pump light from the first optical waveguide into the second and third optical waveguides so that the Erbium in the second and third optical waveguides is optically pumped at the pump light wavelength to produce second and third output light beams having the output wavelength in the second and third optical waveguides, respectively; and
   separating light having the pump light wavelength in the second and third optical waveguides from the output light to reduce the pump light intensity in the output of the optical waveguide.

17. The method of claim 16 wherein the step of separating light having the pump light wavelength from the output light includes the step of reflecting light having the pump light wavelength in each of the first, second and third optical waveguides.

18. The method of claim 17 wherein the step of reflecting the light having the pump light wavelength includes the step of forming a grating adjacent each of the first, second and third optical waveguides with the grating spacing and the pump light wavelength satisfying the Bragg condition that $2\Lambda = (m\lambda/n_{eff})$, where m is an integer, $\Lambda$ is the grating period and $\lambda$ is the wavelength of the pump light.

19. The method of claim 18 including the step of forming a grating adjacent the optical coupler to reflect light having the output wavelength toward the output end of the first, second and third optical waveguides.

20. The method of claim 18 including the step of forming a grating adjacent the optical coupler to reflect light having the output wavelength toward the output end of the first, second and third optical waveguides.

21. The method of claim 16 wherein the step of separating light having the pump light wavelength from the output light includes the step of optically coupling light having the pump wavelength out of the first waveguide.

22. The method of claim 14 including the step of forming a grating adjacent the input end of the grating to reflect light having the output wavelength toward the output end of the waveguide.

* * * * *